United States Patent Office 3,168,046
Patented Feb. 2, 1965

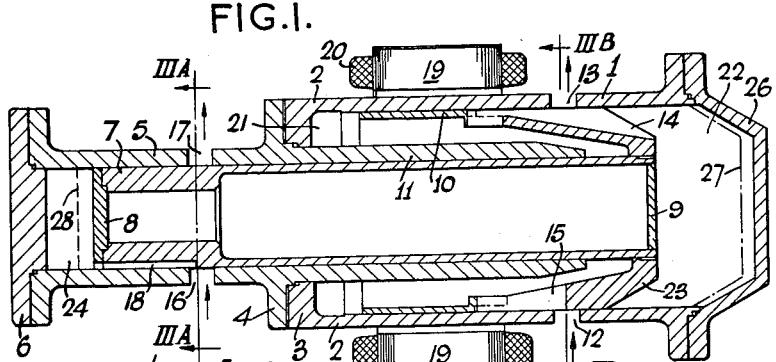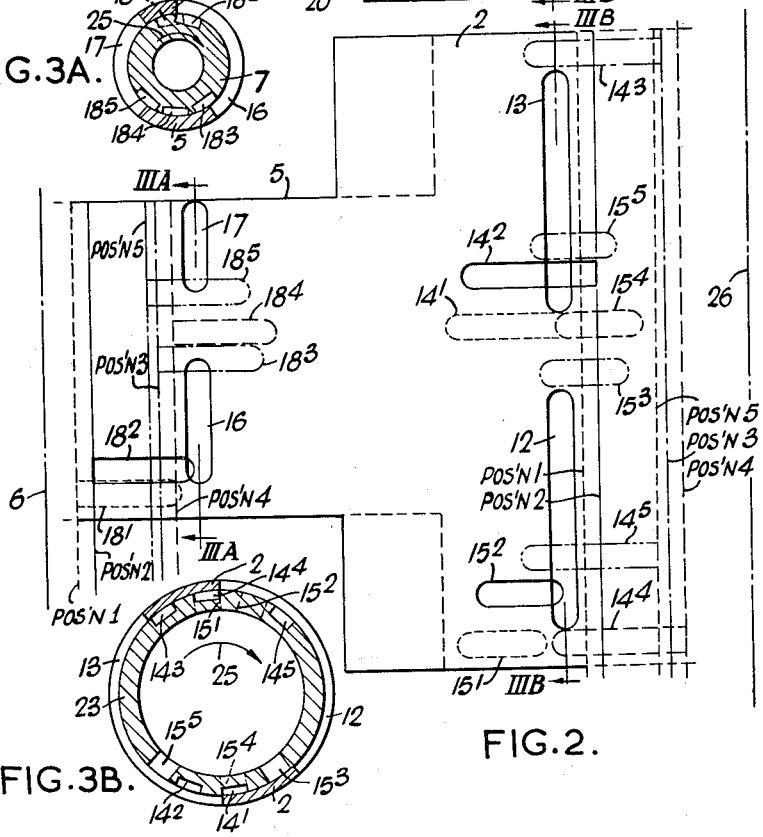

3,168,046
FLUID OPERATED PUMP SYSTEMS
Allan Barker and John Ashton, Saughall, near Chester, England, assignors to United Kingdom Atomic Energy Authority, London, England
Filed May 17, 1960, Ser. No. 29,600
Claims priority, application Great Britain May 20, 1959
2 Claims. (Cl. 103—50)

This invention relates to fluid operated pump systems.

Fluid operated pump systems comprising two relatively movable bearing members of smooth surface separated from one another by a lubricating gas film are known. The gas film may be provided from an external pressurised source (a hydrostatic bearing) or the film may be generated by the relative movement of the members (a hydrodynamic bearing). Two forms of surface may be used, namely that provided by two flat plates rotating relative to one another about their common axis, and that provided by a shaft rotating relative to a sleeve. A hydrodynamic bearing demands sustained relative movement between the members, reciprocating movement being impracticable as at periods of zero or low velocity before, during and after reversal of direction the relative velocity is not adequate to generate the gas film.

It is one object of the present invention to provide a hydrodynamic gas bearing system whereby reciprocating movement becomes practicable.

According to the invention a fluid pump system is provided with means for creating relative movement between two mutual bearing members, the movement being such that a reciprocating movement is superimposed on a sustained movement, the sustained movement creating a gas film lubricating the system.

The invention has one application to the pumping of pressurised gas containing radio-active contamination. In this application one bearing member is a sleeve enclosed in a casing and the other bearing member is a double ended piston reciprocated in the sleeve by pressurised gas applied at one end of the piston, and the other end of the piston pumps the radio-active contaminated gas, the piston rotating under the influence of a rotating magnetic field and the casing having ports for flow of gas which are opened and closed by the combined reciprocating and rotary movement of the piston. The piston has a skirt of magnetic material housed in the casing, the casing having an externally disposed electrical stator to rotate the piston via the skirt.

By way of example, a system according to the invention utilised in a compressor will now be described with reference to the accompanying drawings wherein:

FIG. 1 is a side view in medial section,
FIG. 2 is a developed diagrammatic view,
FIG. 3A is a section on the line IIIA—IIIA of FIGS. 1 and 2, and
FIG. 3B is a section on the line IIIB—IIIB of FIGS. 1 and 2 (the peripheral parts only being shown).

Referring to FIG. 1, a compressor 1 comprises a casing in two parts, namely, a cylinder 2 and a cylinder 5, the cylinders 2, 5 being sealed together at their flanged ends 3, 4. The cylinder 2 has a sealed end plate 26 and the cylinder 5 has a sealed end plate 6. The casing houses a rotatable assembly comprising a double ended hollow piston 7 having one end surface formed by a plate 8 and the other end surface formed by a plate 9 and a conical skirt 23. The piston 7 also has a skirt 10 of magnetic material joined to the skirt 23. A sleeve 11 is provided for the piston 7, the sleeve 11 being formed as an extension of the cylinder 5. The cylinder 2 has an inlet port 12 and an outlet port 13 and the skirt 23 has longitudinal slots 14, 15. The cylinder 5 has an inlet port 16 and an outlet port 17 and the piston 7 has a longitudinal slot 18. (The ports 12, 13, 16 and 17 are of slot form as shown in FIG. 2.) The piston 7 is of such a fit in the sleeve 11, and the surface finish of the piston 7 and the sleeve 11 is such that a lubricating film of gas can be maintained between them by relative rotation. The skirts 10, 23 have a slight clearance in the cylinder 2. Externally disposed around the cylinder 2 is an electrical polyphase stator 19 having windings 20.

In general terms, the operation is as follows. The cylinder 2 and end plate 26 define a driving cylinder space and the cylinder 5 and end plate 6 define a compressing cylinder space. The piston 7 is rotated by flux from the stator 19 coupling with the skirt 10, the skirt 10 being of length such that it remains coupled with the flux despite the reciprocating movement. The piston 7 is reciprocated by pressurised gas fed to the inlet port 12 to act first on one side of the plate 9 and skirt 23 through slot 14 and then on the under side of the skirt 23 through slot 15, the gas exhausting from the outlet port 13. Radio-active contaminated gas being pumped by the compressor 1 is fed to the inlet port 16 and exhausted from the outlet port 17, inlet and outlet to the cylinder 5 being controlled by the slot 18 as it rotates and reciprocates.

FIG. 2 is a developed diagrammatic view of the compressor casing (cylinders 5 and 2) and has, superimposed in full outline, the positions of the slots 14, 15 and 18 corresponding to the position of the piston 7 (and skirt 23) shown in FIG. 1: in dotted outline are superimposed the different positions of the slots 14, 15 and 18 for four other positions of the piston 7 during one revolution.

FIG. 3A shows a sectional view of the piston 7 and the cylinder 5 and the five rotary positions of the slot 18 corresponding to the five longitudinal positions shown in FIG. 2. Similarly FIG. 3B shows a sectional view of the skirt 23 and cylinder 2 and the corresponding five positions of the slots 14, 15. (The parts 11 and 7 which also lie in the section have been omitted, FIGS. 3A and 3B being provided merely to show the function of the slots 14, 15 and 18.) For clarity the five longitudinal positions are numbered "Pos'ns" 1 to 5 in FIG. 2 and the slots 14, 15 and 18 are given suffixes corresponding to these positions FIGS. 2, 3A and 3B.

Position 1 indicates the piston 7 at its extreme left-hand position having reached the end of the compression stroke. The ports 12, 13, 16, 17 are closed and the position of the slots 14, 15, 18 are shown at $14^1$, $15^1$ and $18^1$ respectively.

Position 2 (which corresponds to the position of the piston 7 shown in FIG. 1) indicates the piston 7 starting to move to the right on its return stroke, direction of rotation being shown by arrow 25. The position of the slots 14, 15, 18 are shown at $14^2$, $15^2$ and $18^2$ respectively. The inlet port 12 is opening via the slot 15 to admit gas to pressurise space 21 (FIG. 1) in the cylinder 2 for the return stroke of the piston 7, whilst the outlet port 13 is opening via the slot 14 to exhaust space 22 (FIG. 1) in the cylinder 2. At the same time the inlet port 16 is opening via the slot 18 to admit gas to space 24 (FIG. 1) in the cylinder 5, the exhaust port 17 being closed.

Position 3 indicates the piston 7 completing the return stroke. The position of the slots 14, 15, 18 are shown at $14^3$, $15^3$ and $18^3$ respectively. The inlet port 12 and the outlet port 13 are closed, the inlet port 16 is closing and the outlet port 17 is closed.

Position 4 indicates the piston 7 at its extreme right-hand position having completed the return stroke. The position of the slots 14, 15, 18 are shown at $14^4$, $15^4$ and $18^4$ respectively. The ports 12, 13, 16, 17 are all closed.

Position 5 indicates the piston 7 starting to move to the left on its compression stroke. The position of the slots 14, 15, 18 are shown at $14^5$, $15^5$ and $18^5$ respectively. The inlet port 12 is about to open via the slot 14 to pressurise the space 22 in the cylinder 2 for the compression stroke of the piston 7 whilst the outlet port 13 has opened via the slot 15 to exhaust the space 21 in the cylinder 2. The inlet port 16 is closed and the exhaust port 17 is opening via the slot 18 to exhaust the space 24 in the cylinder 5.

The clearance volumes in the cylinders 2, 5 (as indicated by dotted boundary lines 27, 28 (FIG. 1) respectively) determine the pressures effecting retardation at the end of the return and compression strokes. For efficient operation both sets of ports must be phased correctly and this is done by choosing a suitable mass and rotating speed for the piston assembly. The stator provides just sufficient torque to rotate the piston against bearing resistance and internal drag.

We claim:

1. A fluid operated pump comprising: an elongate casing; a stationary sleeve enclosed in said casing; a double ended piston defining two opposing end surfaces and an intermediate cylindrical bearing surface, the piston being rotatable and reciprocable in the sleeve; an electrical stator mounted on the casing; means on the piston responsive to the stator for rotating the said piston; first inlet and outlet port means on the casing adjacent one end thereof for flow of a pressurized fluid into and out of a first space in the casing at the said one end, and second inlet and outlet port means on the casing adjacent the other end thereof for the operative passage of a second fluid into and out of a second space in the other end of the casing; the piston defining first and second slot means adjacent one end of the piston, each of the slot means operatively and alternately communicating with the first inlet and outlet port means during rotation of the piston, the first slot means directing the pressurized fluid toward one side of the end surface at the one end of the piston and the second slot means directing the pressurized fluid toward the other side of the said end surface at the one end to reciprocate the piston during the alternate communication; and the piston defining third slot means adjacent the other end thereof for alternately connecting the second inlet and outlet ports to the said second space for pumping of the second fluid therethrough on reciprocation and rotation of the piston.

2. A fluid operated pump according to claim 1 wherein the means on the piston responsive to the stator comprises a skirt of magnetic material housed in the casing, the electrical stator rotating the piston by flux coupling with the skirt, and the skirt being of a length such that it remains coupled with the flux despite the reciprocating movement of the piston.

References Cited in the file of this patent
UNITED STATES PATENTS

| | | |
|---|---|---|
| 970,435 | Dourte | Sept. 13, 1910 |
| 1,954,002 | Tursky | Apr. 10, 1934 |
| 2,698,580 | Evans | Jan. 4, 1955 |
| 2,928,960 | Macks | Mar. 15, 1960 |